J. N. BURRIS.
NON-SKID ATTACHMENT FOR VEHICLE TIRES.
APPLICATION FILED APR. 19, 1917.
1,298,001. Patented Mar. 25, 1919.
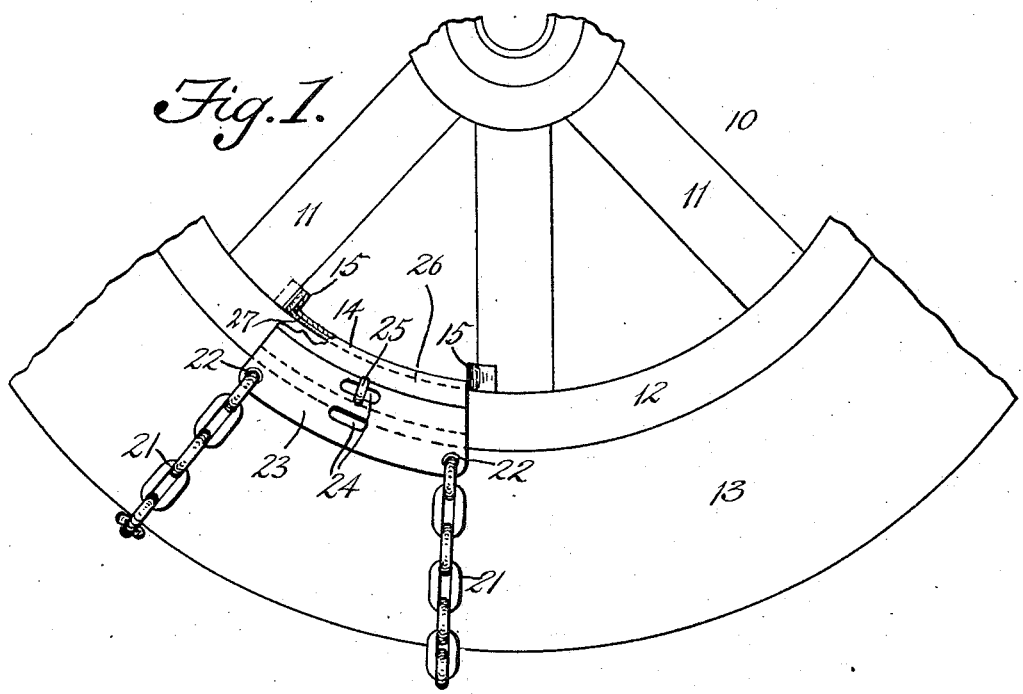
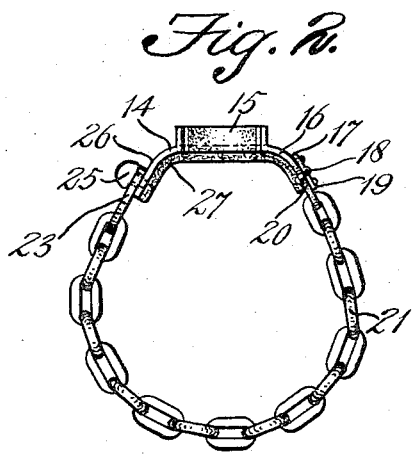
INVENTOR
James N. Burris.
BY Richard Bowen
ATTORNEY
WITNESSES

UNITED STATES PATENT OFFICE.

JAMES N. BURRIS, OF DAVENPORT, IOWA.

NON-SKID ATTACHMENT FOR VEHICLE-TIRES.

1,298,001. Specification of Letters Patent. Patented Mar. 25, 1919.

Application filed April 19, 1917. Serial No. 163,290.

*To all whom it may concern:*

Be it known that I, JAMES N. BURRIS, a citizen of the United States, residing at Davenport, in the county of Scott and State of Iowa, have invented certain new and useful Improvements in Non-Skid Attachments for Vehicle-Tires, of which the following is a specification.

This invention relates to a non-skid attachment for automobile tires, and has for its principal object to provide a simple, easily applied clip that forms one of a group of clips to be placed about the tire of an automobile wheel to prevent the machine from skidding, and may be quickly and easily put on at any time and in any place without the exertion of raising the car from the ground, necessary at the present time to apply the well-known chain attachments and others which are in common use at the present time.

Another object of the invention is to provide a simple attachment which will be strong and durable and which when injured or damaged may be readily and quickly removed so that a new one may be substituted.

With the above as the principal objects in view, the invention consists of the novel construction, combination, and arrangement of parts hereinafter described, pointed out in the appended claim and illustrated in the accompanying drawings, in which—

Figure 1 is a side elevation of a portion of an automobile wheel with one of the non-slip clips in position thereon, and Fig. 2 is a similar view of the clip as viewed from the right of Fig. 1.

In the drawings, 10 indicates an automobile wheel of which 11 are the spokes, 12 the rim and 13 the tire which may be pneumatic or any other tire usually applied to an automobile wheel.

The clip is formed of a plate 14 of arcuate shape both longitudinally and transversely and of a length to fit easily about the rim 12 of the wheel between two of the spokes as shown. On each end of the plate 14 is a short upstanding flange 15 arcuately formed to partly encircle the adjacent spoke 11 where it connects with the rim 12. The length of the plate is sufficiently shorter than the distance between two adjacent spokes of the wheel to permit the plate to be thrust into position between the spokes for engaging the rim of the wheel. The side 16 of the plate 14 that curves over the inner side of the rim 12 has riveted or otherwise secured thereto one leaf 17 of a hinge 18, the other leaf 19 being similarly secured to a narrow plate 20 of a length equal to the length of the clip 14. The plate is provided with a perforation at each end and a pair of short chains 21 are attached to the plate the end link in each chain being received in one of the perforations as shown. These two chains extend transversely around the tire and are connected at their other ends by the terminal links thereof engaging perforations 22 in the ends of an arcuately curved plate 23 in the center of which are two longitudinal slots 24, either of which may be passed over a T-headed key 25 rotatably mounted near the lower edge of the outer side 26 of the clip 14 and in the center thereof. Preferably the inner surface of a clip 14, is lined with felt, rubber, or other suitable material 27 to prevent marring the surface of the rim 12, this lining extending upwardly into the concave portions of the flanges 15 to cushion the surface of said flanges and to yield and permit the introduction of the clip between the spokes.

In using this clip, as many as are needed may be applied to the wheel before starting on a journey, but if they have not been so applied and their need becomes imperative at any time during the journey, it is only necessary to place them one at a time on the wheel by separating the plate 23 from the clip 14 and after placing the clip between the two spokes and against the rim, the chains are brought around the exterior of the tire and the plate 23 placed against the clip 14, one or the other of the openings 24 being slipped over the key 25 and the latter turned at a right angle to the opening to hold the plate 23 in place. It is to be noted that the proper opening will be determined by the diameter of the tire and because of this difference in diameter, a plurality of openings are employed. The chains encircling the tire hold the clip against the rim and the arcuate lugs 15 are sufficiently close to the spokes to prevent rattling from longitudinal movement of the clip on the tire. These clips it is readily understood can be applied to the wheel at those portions that are free of the ground, and if necessary, they may be applied to the portions of the wheel on the ground after each wheel has made a partial revolution so that it is very evident that the attachment may be placed in position without the trouble of raising the wheel from the ground by means of a jack before the attachment can be placed in position. It is also evident that should any one of the chains break, or the clip become injured in any way, it may be quickly removed when it is not in contact with the ground and a new clip substituted in place.

What I claim is:

A non skid attachment for automobile wheels comprising a rigid plate longitudinally and transversely curved to snugly embrace the rim of a wheel, an inwardly curved radially extending flange on each end of said plate to partly encircle the adjacent spoke of the wheel, said flanges preventing transverse movement and undue longitudinal movement of the plate, the length of the plate being sufficiently shorter than the distance between two adjacent spokes to permit the plate to be thrust into position between the spokes for engaging the rim of the wheel, a pair of chains adapted to pass transversely across the tire, each chain being hingedly attached at one end to one side of the plate, and means joining the other ends of the chains for releasably connecting them to the opposite side of the plate.

In testimony whereof I affix my signature in presence of two witnesses.

JAMES N. BURRIS.

Witnesses:
 WM. VOSS,
 HENRY E. VOSS.